(No Model.)
C. W. BRADFORD.
CUTTING APPARATUS FOR MOWERS.
No. 359,992. Patented Mar. 29, 1887.
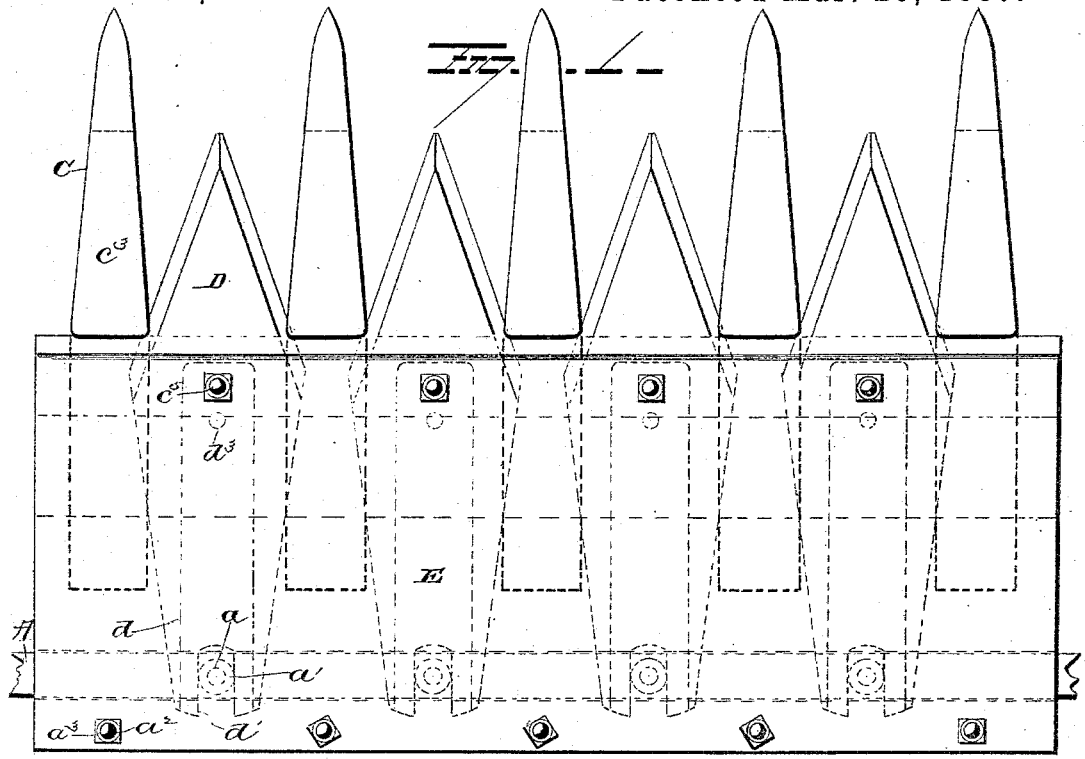
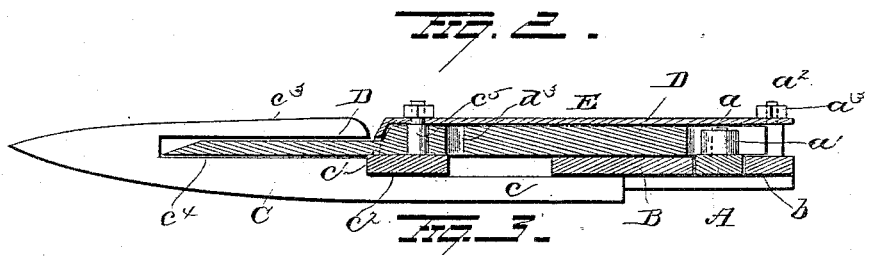
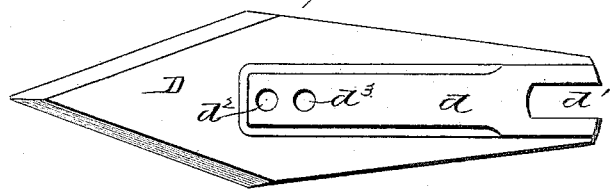
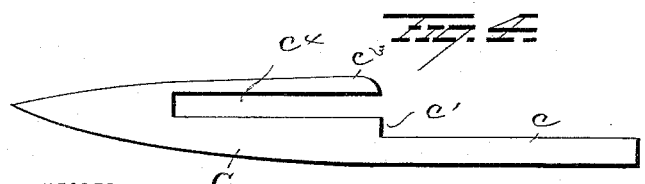
WITNESSES
INVENTOR
Charles W Bradford
By H. A. Seymour
Attorney

United States Patent Office.

CHARLES W. BRADFORD, OF THORNDIKE, ASSIGNOR OF ONE-HALF TO GEORGE F. TERRY, OF UNITY, MAINE.

CUTTING APPARATUS FOR MOWERS.

SPECIFICATION forming part of Letters Patent No. 359,992, dated March 29, 1887.

Application filed September 2, 1886. Serial No. 212,514. (No model.)

*To all whom it may concern:*

Be it known that I, CHARLES W. BRADFORD, of Thorndike, in the county of Waldo and State of Maine, have invented certain new and useful Improvements in Cutting Apparatus for Mowers; and I do hereby declare the following to be a full, clear, and exact description of the invention, such as will enable others skilled in the art to which it appertains to make and use the same.

My invention relates to the cutting apparatus of mowers, &c.; and the objects of my invention are to produce a cutting apparatus in which the teeth shall operate to draw the stems of grass or other vegetation inward between the fingers, and in which the cutters or blades shall be readily removable for grinding and replacement, but also separable, so as to simplify the operation of grinding or sharpening.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a plan view of the cutting apparatus. Fig. 2 is a transverse vertical section of the same. Fig. 3 is a view of one of the cutters or blades detached. Fig. 4 is a view of one of the guard-fingers detached.

In the said drawings, A designates the cutter-bar, which is designed to receive a longitudinal reciprocatory motion by the usual or any preferred connections from the master-wheel. This cutter-bar reciprocates within a slot, $b$, which is formed longitudinally in the supporting-frame B of the cutting mechanism of a mower or reaper. Upon the under side of this frame B are secured, at their inner lower ends, a number of guard-fingers, C, as shown. Each of these guard-fingers is pointed at its outer end in the usual manner, and extends rearwardly, as shown at $c$, to its point of connection with the frame B. A shoulder, $c'$, is formed at the inner end of each finger C, and across the upper sides of each of said guard-fingers, contiguous to their shoulders $c'$, is secured a strip, $c^2$. Each guard-finger C is formed on its upper side with a rearward extension or guard, $c^3$, so as to leave a recess, $c^4$, in which the cutter-teeth D reciprocate.

Each cutter-tooth D is of triangular form, as shown, and has a re-enforce, $d$, which is slotted at $d'$ at its inner end, and also has two or more holes, $d^2$ $d^3$, to receive pins $c^5$, which project from the upper side of the strip $c^2$. The cutter-bar A also carries a series of pins, $a$, extending from its upper side, and surrounded by anti-friction rollers $a'$, which are embraced by the arms formed by the slots or recesses $d'$ in the inner ends of the re-enforces $d$ of the cutters D.

E designates a shield, which is perforated to receive the ends of the pins $a$, and also the ends of pins $a^2$, nuts $a^3$ being screwed upon the outer ends of some or all of the pins $a$ $a^2$ in order to secure the shield E in proper position. The shield E may be formed in one piece, or it may be made in sections, each capable of being removed independently of the others.

It will thus be seen that as the cutters vibrate pivotally beneath the extension or guard $c^3$ of the guard-fingers C they draw the stems of the grass or other vegetation inward toward the frame B, instead of forcing the stems outward, as has heretofore been the case. It will also be seen that each cutter may be readily detached from the others and accurately ground and replaced, or a new cutter may be readily inserted in place of the old one. Furthermore, when the cutters have become worn down sufficiently to cause them to cut imperfectly, the cutter may be advanced by shifting it to a hole, $d^3$, for example, thus renewing its life and saving the expense of a new cutter.

Having fully described my invention, what I claim as new, and desire to secure by Letters Patent, is—

1. In a reaper or mower, the combination, with a series of guard-fingers, of a series of pivoted cutters, each having a series of bearings or points for connection with the finger-bar, whereby the cutters can be moved forward when worn, substantially as set forth.

2. In a reaper, the combination, with a series of guard-fingers, of a series of pivoted cutters, each having a series of bearings or points for connection with the finger-bar, whereby the cutters can be moved forward when worn, and a slotted rear end, and a cutter-bar having a series of pins, which latter rest within the slots in the cutters, substantially as set forth.

3. The combination, with a strip, $c^2$, having pins $c^5$ and guard-fingers, of the pivoted cutters, each having two holes, $d^2 d^3$, and a cutter-bar for vibrating the cutters.

In testimony whereof I have signed this specification in the presence of two subscribing witnesses.

CHARLES W. BRADFORD.

Witnesses:
   HENRY L. SHUTE,
   GEO. W. TERRY.